United States Patent
Brezger et al.

(10) Patent No.: US 10,155,249 B2
(45) Date of Patent: Dec. 18, 2018

(54) METHOD FOR PRODUCING A DISK CARRIER ASSEMBLY AND DISK CARRIER ASSEMBLY

(71) Applicant: BorgWarner Inc., Auburn Hills, MI (US)

(72) Inventors: Friedrich Philipp Brezger, Karlsruhe (DE); Alexander Moser, Ketsch (DE); Rainer Gerathewohl, Karlsruhe (DE)

(73) Assignee: BorgWarner Inc., Auburn Hills, MI (US)

( * ) Notice: Subject to any disclaimer, the term of this patent is extended or adjusted under 35 U.S.C. 154(b) by 27 days.

(21) Appl. No.: 15/343,739

(22) Filed: Nov. 4, 2016

(65) Prior Publication Data
US 2017/0128980 A1 May 11, 2017

(30) Foreign Application Priority Data

Nov. 6, 2015 (DE) .................. 10 2015 014 290
Sep. 10, 2016 (DE) .................. 10 2016 010 994

(51) Int. Cl.
| | |
|---|---|
| *B05D 3/02* | (2006.01) |
| *B05D 3/12* | (2006.01) |
| *F16D 13/58* | (2006.01) |
| *F16D 65/02* | (2006.01) |
| *F16D 13/68* | (2006.01) |

(52) U.S. Cl.
CPC ............ *B05D 3/0254* (2013.01); *B05D 3/12* (2013.01); *F16D 13/58* (2013.01); *F16D 13/683* (2013.01); *F16D 65/02* (2013.01); *F16D 2065/1364* (2013.01); *F16D 2200/006* (2013.01); *F16D 2250/0046* (2013.01)

(58) Field of Classification Search
None
See application file for complete search history.

(56) References Cited

U.S. PATENT DOCUMENTS

2012/0111677 A1* 5/2012 Fracasso ............ F16D 65/0971
188/325

FOREIGN PATENT DOCUMENTS

| DE | 10 2008 019 164 A1 | 10/2009 |
|---|---|---|
| DE | 10 2013 021 659 A1 | 6/2015 |

OTHER PUBLICATIONS

English language abstract and machine-assisted English translation for DE 10 2008 019 164 extracted from espacenet.com database on Dec. 19, 2016, 31 pages.
English language abstract and machine-assisted English translation for DE 10 2013 021 659 extracted from espacenet.com database on Dec. 19, 2016, 30 pages.

* cited by examiner

*Primary Examiner* — Erma C Cameron
(74) *Attorney, Agent, or Firm* — Howard & Howard Attorneys PLLC

(57) ABSTRACT

The present invention relates to a method for producing a disk carrier assembly (2), comprising the method steps: providing a disk carrier (18) with a tubular section (20), applying a liquid or viscous material (48) on the tubular section (20) to form a support ring (32) surrounding the tubular section (20), and curing the support ring (32). In addition, the present invention relates to a disk carrier assembly (2).

20 Claims, 2 Drawing Sheets

METHOD FOR PRODUCING A DISK CARRIER ASSEMBLY AND DISK CARRIER ASSEMBLY

CROSS-REFERENCE TO RELATED APPLICATIONS

This application claims the benefit of German Patent Application No. 102015014290.9 filed on Nov. 6, 2015 and German Patent Application No. 102016010994.7 filed on Sep. 10, 2016, the disclosure of which is herein incorporated by reference in its entirety.

FIELD OF THE INVENTION

The present invention relates to a method for producing a disk carrier assembly, in particular for a disk clutch and disk brake, and also a disk carrier assembly produced or producible according to the method.

BACKGROUND OF THE INVENTION

DE 10 2008 019 164 A1 describes a disk carrier assembly and a method for producing the same according to the prior art. In the known method, initially a disk carrier is provided which has a tubular section, thus for example a disk carrier section. In addition, a closed support ring is provided, which is pulled or pushed over the tubular section of the disk carrier in order to fix the support ring on the disk carrier so that the support ring surrounds the tubular section of the disk carrier and prevents the expansion of the tubular section at high rotational speeds of the disk carrier, in that the tubular section is supported outwardly in the radial direction on the support ring. In addition, the listed document discloses a clamp-like support ring which is provided with a clamping mechanism so that the inner diameter of the support ring may be adjusted to the outer diameter of the tubular section of the disk carrier. The clamping mechanism of the clamp-like support ring hereby proves, however, to be disruptive, particularly as the weight thereof, insofar as it is not offset, may lead to an imbalance during a rotation of the disk carrier.

Against this background, DE 10 2013 021 659 A1 describes a method for producing a disk carrier assembly in which the tubular section of a disk carrier is multiply wound with an elongated support element, wherein at least one end of the elongated support element is connected to a section of the support element or to the tubular section of the disk carrier in order to fix the inner diameter of the support ring thus generated, permanently if possible.

Starting from the method for producing a disk carrier assembly according to the prior art, it is the object of the present invention to describe a method which is relatively easy to carry out and enables a particularly exact adjustment of the support ring to the tubular section of the disk carrier assigned to the support ring in order to also be able to compensate for possibly present manufacturing tolerances. In addition, the underlying object of the present invention is to create a disk carrier assembly which is easy to produce, if necessary using the method according to the invention, and guarantees a secure protection against an expansion of a tubular section of the disk carrier of the disk carrier assembly.

This problem is solved by the present invention.

SUMMARY OF THE INVENTION

The method according to the invention functions to produce a disk carrier assembly. The disk carrier assembly is preferably a disk carrier assembly for a disk clutch or disk brake. Thus, the method according to the invention has the method step of providing a disk carrier with a tubular section. Basically, the disk carrier may be an inner or an outer disk carrier, preferably it is an outer disk carrier. The disk carrier may have, for example, the tubular section which is preferably formed as the disk carrying section, and, if necessary, a radial section which connects to the tubular section in an axial direction and functions to support the tubular section. Finally, a liquid or viscous material is applied onto the tubular section to form a support ring surrounding the tubular section. The liquid or viscous material may be a curable material so that the previously liquid or viscous support ring cures or is cured in the context of a subsequent method step, wherein the curing may proceed automatically or might be triggered in a targeted way by the application of temperature and/or light. In each case, a now cured support ring surrounding the tubular section is created, which may be particularly exactly adjusted to the contour of the tubular section, which contacts it closely, and thus enables a secure support of the tubular section of the disk carrier in the radial direction on the support ring; without possible manufacturing tolerances, generated during the creation of the tubular section, having an effect. It is also clear from the preceding description that the application of the liquid or viscous fluid to generate the support ring surrounding the tubular section is relatively easy to carry out.

In one preferred embodiment of the method according to the invention, a material which shrinks during the curing thereof is used as the liquid or viscous material. Thus, a particularly close contacting of the ultimately cured support ring on the tubular section may be achieved in order to enable a secure support of the tubular section on the cured support ring outward in the radial direction.

In one particularly preferred embodiment of the method according to the invention, the shrinkage of the liquid or viscous material occurs under a pretension of the support ring against the tubular section inward in the radial direction. Due to the targeted pretension of the support ring thus achieved against the tubular section inward in the radial direction, the disk carrier of the disk carrier assembly to be produced may be suited in particular for higher rotational speeds without fearing an expansion of the tubular section of the disk carrier. In addition, at a correspondingly higher pretension of the support ring against the tubular section inward in the radial direction, a positive-locking fixing of the support ring on the tubular section in the axial direction may be optionally omitted so that the production and the structure are further simplified.

In order to further simplify the method for producing the disk carrier assembly, in another preferred embodiment, a material, which forms a bonded connection to the tubular section during curing and/or an adhesive material, is used as the liquid or viscous material. By this means, a positive-locking fixing of the support ring on the tubular section in the axial direction may be omitted, so that not only the production method, but also the structure of the disk carrier assembly is significantly simplified.

In order to create a particularly solid support ring and thus a disk carrier assembly, in which the tubular section of the disk carrier is also protected against expansion at relatively high rotational speeds, in one particularly advantageous method according to the invention, additional fiber material and/or fabric material may be applied to the tubular section for forming the support ring from the liquid or viscous material and the fiber material and/or fabric material. In this way, for example, a support ring is producible from a fiber composite material.

In order to effect a particularly good mixing or impregnation in the support ring made from the liquid or viscous material and the fiber material and/or fabric material in another preferred embodiment of the method according to the invention, the fiber material and/or fabric material is initially mixed or impregnated with the liquid or viscous material, and subsequently the fiber material and/or fabric material, together with the liquid or viscous material, is applied to the tubular section for forming the support ring.

Although the previously described embodiment, according to which the fiber material and/or fabric material, together with the liquid or viscous material, is applied to the tubular section for forming the support ring, has proven to be particularly advantageous with respect to the production, another embodiment of the method according to the invention has certain advantages, in which the fiber material and/or fabric material is initially applied to the tubular section, and subsequently the liquid or viscous material is applied to the tubular section for mixing with the fiber material and/or fabric material or impregnating the fiber material and/or fabric material. Alternatively, in this embodiment variant, the liquid or viscous material may be applied first to the tubular section, and subsequently the fiber material and/or fabric material may be applied on the tubular section for mixing with or impregnating the fiber material and/or fabric material with the liquid or viscous material.

In order to be able to apply the previously mentioned fiber material and/or fabric material quickly and easily, the fiber material and/or fabric material is provided as string-like and/or strip-like in another particularly advantageous embodiment of the method according to the invention. The provision is not only hereby simplified, but also the fiber material and/or fabric material may be applied in a more targeted and relatively more exact predetermination of the dimensions of the support ring.

In another particularly preferred embodiment of the method according to the invention, the string-like and/or strip-like fiber material and/or fabric material is wound around the tubular section of the disk carrier in order to simplify the method. It has hereby proven advantageous if the winding of the string-like and/or strip-like fiber material and/or fabric material around the tubular section is carried out at a winding angle of more than 360°, at least 720°, or more than 720° in order to create a particularly stable support ring for the tubular section of the disk carrier. It is thereby advantageous if the string-like and/or strip-like fiber material and/or fabric material has a corresponding length in order to achieved the desired winding angle continuously or as one piece. As already indicated previously, it is also advantageous in this embodiment, if the string-like and/or strip-like fiber material and/or fabric material has already been mixed or impregnated with the liquid or viscous material before application on the tubular section so that the liquid or viscous material is applied or wound together with the string-like and/or strip-like fiber material and/or fabric material.

In order to create a particularly stable support ring which guarantees high rotational speeds of the disk carrier or of the disk carrier assembly, the fiber material and/or fabric material contains carbon fiber materials and/or carbon fiber material fabric and/or fiberglass and/or fiberglass fabric in another advantageous embodiment of the method according to the invention. Alternatively, the fiber material and/or fabric material may be made of carbon fiber materials and/or carbon fiber material fabric and/or fiberglass and/or fiberglass fabric.

According to another advantageous embodiment of the method according to the invention, the liquid or viscous material used is a material curable at least partially at room temperature and/or at temperatures greater than room temperature.

In another advantageous embodiment of the method according to the invention, the liquid or viscous material used is a photo-curable material and/or a plastic, lacquer, adhesive, or resin, preferably epoxy resin.

In another advantageous embodiment of the method according to the invention, the curing of the support ring is carried out at least partially automatically at room temperature. Consequently, the curing of the support ring in this embodiment may also be carried out completely at room temperature. Alternatively or supplementally, the curing of the support ring in this embodiment is carried out at least partially by heating the support ring at or using a temperature greater than room temperature. It has hereby proven advantageous, if the temperature greater than room temperature is subjected to chronological changes in order to influence the curing of the support ring and, if necessary, the shrinkage thereof during curing in a targeted way.

In another preferred embodiment of the method according to the invention, the previously mentioned curing of the support ring is initially carried out automatically at room temperature and subsequently by heating.

In another particularly preferred embodiment of the method according to the invention, a surface section of the tubular section, on which the liquid and/or viscous material is applied, is roughened prior to the application. By this means, a particularly large contact surface between the curing support ring and the surface section of the tubular section of the disk carrier is achieved. Consequently, a particularly good cohesion of the tubular section and support ring is achievable, in particular if the liquid or viscous material is a material which materially bonds to the tubular section and/or is adhesive. Although basically any method for roughing the listed surface section may be considered, a previous sand blasting of the listed surface section has proven particularly advantageous.

The tubular sections of disk carriers often have, in particular if this is the disk carrying section of the disk carrier, depressions and/or recesses. Thus, these depressions may be, for example, radial depressions, which are formed on the structure of the tubular section as rotary driving contours for the disks, particularly as such a rotary driving contour generally has a course that deviates from a circle. The recesses, in contrast, may be, for example, through openings for oil. It has proven advantageous, with respect to the operating behavior of the disk carrier or of the disk carrier assembly, if the depressions and/or recesses are not or possibly partially filled with the material of the support ring, thus, for example, with the liquid or viscous material and/or the fiber material and/or fabric material. In this context, in another preferred embodiment of the method according to the invention, the liquid or viscous material, if necessary also the fiber material and/or fabric material, is applied to the tubular section while creating a support ring which bridges depressions and/or recesses in the tubular section. It is hereby preferred if the section of the support ring bridging the depressions and/or recesses has an essentially straight line course, thus bridges the depression or recess along the shortest path. For example, a certain pretension may also be applied in this case, in particular during use of a string-like and/or strip-like fiber material and/or fabric material.

In order to simplify the previously mentioned application of the support ring bridging depressions and/or recesses in the tubular section, in another advantageous embodiment of the method according to the invention, a filler for holding back the liquid or viscous material, if necessary also the fiber material and/or fabric material, is introduced into the depressions and/or recesses prior to the application. The depression and/or recess does not necessarily have to be completely filled in this case. It is also preferred if the filler is introduced in such a way that a straight line bridging of the depression and/or recess is guaranteed by the corresponding section of the support ring. In this case, in particular when using a string-like or strip-like fiber material and/or fabric material, a certain pretension may be applied during winding, which pretension is also retained after a possible removal of the filler. Basically, the listed filler may remain in the depressions and/or recesses if this filler would not influence the operating behavior of the disk carrier to the same extent that the cured liquid or viscous material and/or the fiber material and/or woven material would; however, it is preferred if the filler is removed from the depressions and/or recesses after the application and curing of the support ring. A filler formed from a mixture of cotton flock and polyester resin has proven advantageous in this context. However, rigid inserts are also possible as fillers. Alternatively to the rigid inserts, pastes or liquid to viscous means may also be used, which at least partially cure prior to the application of the support ring.

As already mentioned with reference to a previously described embodiment, it is advantageous to use a material, which shrinks during curing, as the liquid or viscous material, and which shrinks against the tubular section inward in the radial direction under pretension of the support ring. In order to either further increase this pretension or to be able to omit a corresponding shrinkable material yet still achieve a pretension, the tubular section is elastically compressed in the radial direction prior to applying the liquid or viscous material, if necessary prior to the application of the fiber material and/or fabric material, wherein the compression is ended after the curing of the liquid or viscous material. Upon ending the elastic compression, the tubular section elastically expands again automatically and thus effects a corresponding pretension of the tubular section against the cured support ring in the radial direction.

The disk carrier assembly according to the invention, which is preferably a disk carrier assembly for a disk clutch or a disk brake, has a disk carrier with a tubular section. The tubular section may hereby basically be any tubular section of the disk carrier, however, the tubular section is preferably formed as a disk carrying section with corresponding rotary driving contours for carrying the disks. The disk carrier is also preferably an outer disk carrier, although the invention is not limited to an outer disk carrier, instead, it may also comprise an inner disk carrier. The tubular section is surrounded by a support ring, on which the tubular section is supported or is supportable outwardly in the radial direction. The disk carrier assembly is also preferably producible or produced by a method of the type according to the invention. The support ring is formed from a fiber composite material. Consequently, it may be a carbon fiber composite material and/or a fiberglass composite.

In one preferred embodiment of the disk carrier assembly according to the invention, the support ring is fixed materially bonded to the tubular section, and/or glued to the tubular section so that, as this is further preferred, a positive locking fixing of the support ring on the tubular section in one of the axial directions may be omitted.

BRIEF DESCRIPTION OF THE DRAWINGS

The invention will be subsequently described in greater detail with the aid of an exemplary embodiment with reference to the appended drawings.

DETAILED DESCRIPTION

Figure 1:
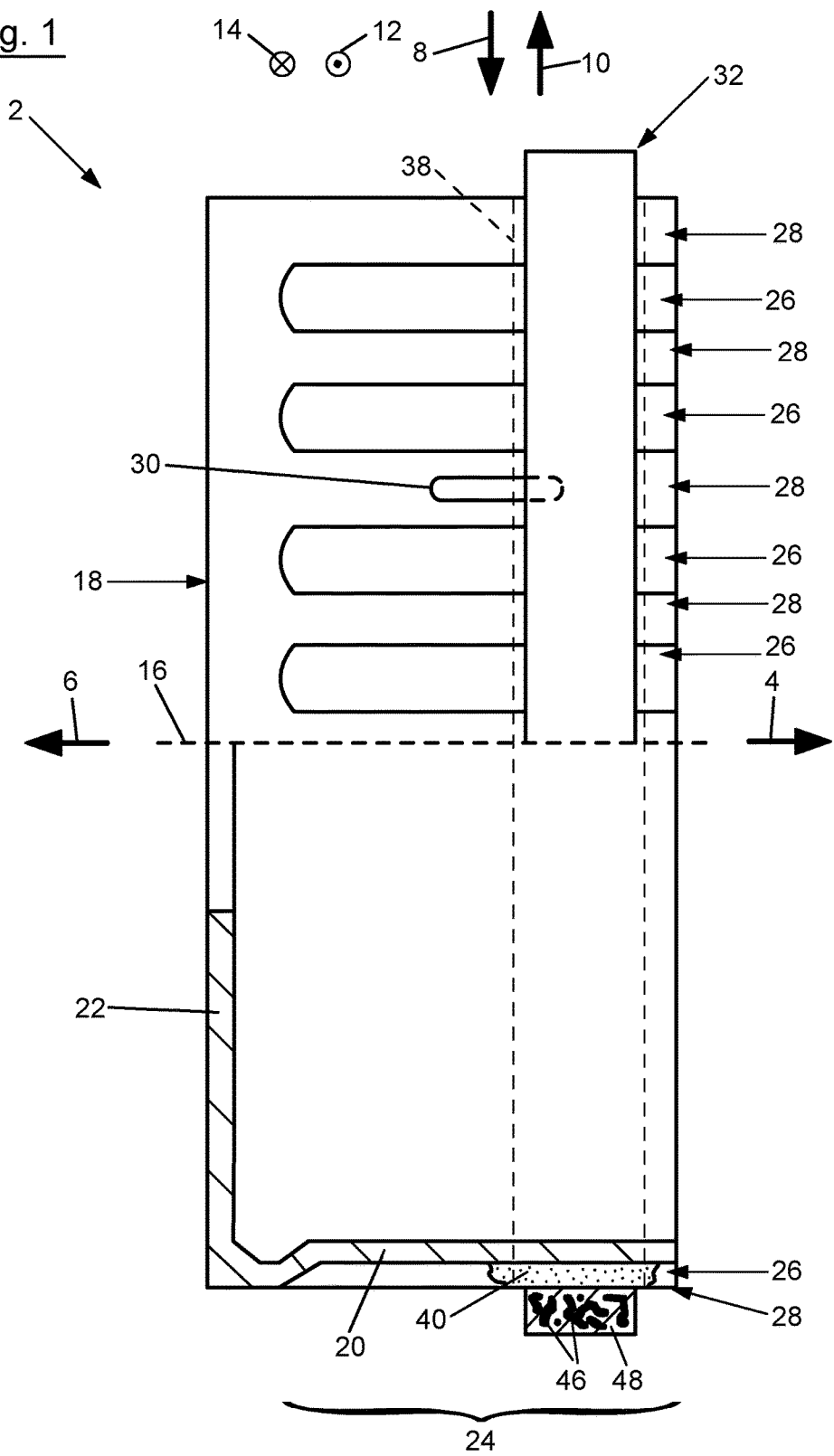
FIG. 1 shows a side view of one embodiment of a disk carrier assembly in a partial cutaway view.

FIG. 1 shows an embodiment of a disk carrier assembly 2. Disk carrier assembly 2 may be, for example a disk carrier assembly 2 for a disk clutch or disk brake. In Figure 1, opposite axial directions 4, 6, opposite radial directions 8, 10, and opposite circumferential directions 12, 14 of disk carrier assembly 2 are indicated by means of corresponding arrows, wherein disk carrier assembly 2 is rotatable at least partially around axis of rotation 16 extending in axial directions 4, 6.

Disk carrier assembly 2 has a disk carrier 18. Disk carrier 18 is formed essentially as pot-shaped and has a tubular section 20 extending essentially in axial direction 4, 6. Tubular section 20 or disk carrier 18 is open in axial direction 4, closed in axial direction 6 with respect to a support section 22 which extends, starting from tubular section 20, inward in radial direction 10 in order to effect a support of tubular section 20 in radial direction 8, 10. Thus, the end section of support section 22 pointing inward in radial direction 10 may be fixed, for example, on a hub or similar.

Tubular section 20 forms at least partially a disk carrying section 24, i.e., this has a rotary driving contour for accommodating outer disks so that these are in rotary driving connection with disk carrying section 24; however, they are displaceable relative to disk carrying section 24 in axial direction 4, 6. From the previous statements, it is additionally clear, that disk carrier 18 depicted here is supposed to be, for example, an outer disk carrier. Due to the design of disk carrying section 24 with a rotary diving contour, multiple depressions 26, longitudinally extended in axial directions 4, 6, are formed in the surface facing outward in radial direction 8, separated from one another in circumferential direction 12, 14, and between the depressions, elevations 28 are formed, also separated from one another in circumferential direction 12, 14. In addition, in FIG. 1, for example, a through opening for oil is provided in tubular section 20, which is provided here by way of example in the area of an elevation 28 and subsequently is to be generally designated as recess 30 in tubular section 20.

Tubular section 20 is surrounded on the end section thereof lying in axial direction 4 by a support ring 32, on which tubular section 20 is supported or is supportable outward in radial direction 8, in particular when disk carrier 18 is rotated at high rotational speeds about axis of rotation 16. Support ring 32 is formed from a fiber composite material or fabric composite material, wherein support ring 32 is fixed materially bonded to tubular section 20 and/or glued to tubular section 20.

Subsequently the procedure during the production of disk carrier assembly 2 according to FIG. 1 will be described in greater detail with reference to FIGS. 1 and 2.

Figure 2:
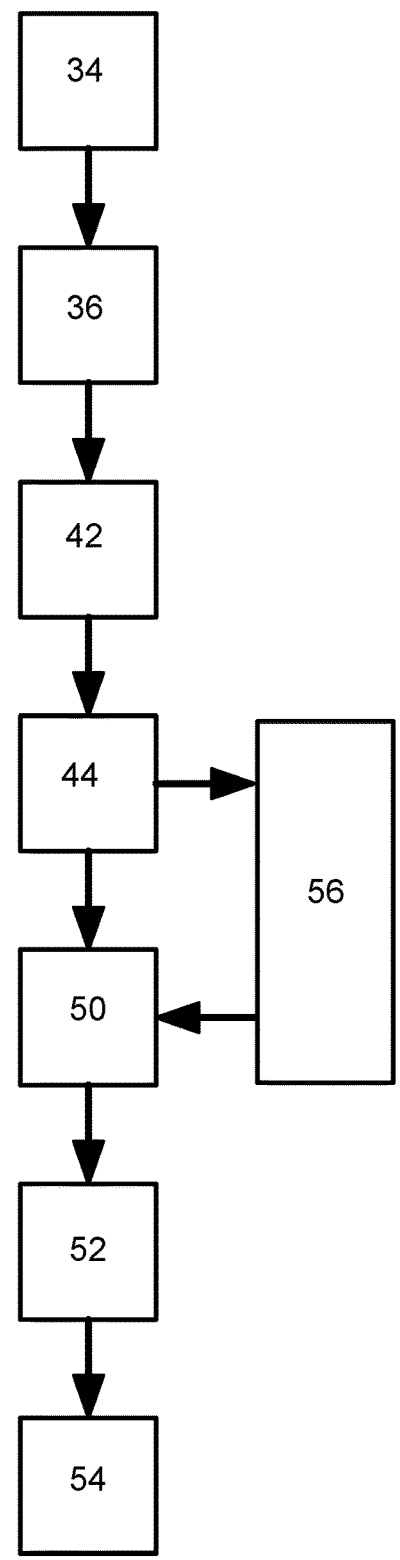
FIG. 2 shows a schematic depiction to clarify one embodiment of the method for producing the disk carrier assembly according to Figure 1.

Initially, disk carrier 18 shown in FIG. 1 with tubular section 20 is provided in method step 34 (FIG. 2). Disk carrier 18 is made preferably out of metal or sheet metal and may, for example, be generated by deep drawing a corresponding sheet metal part, wherein it is preferred if tubular section 20 and support section 22 are formed as one piece with one another.

Subsequently, in method step 36, a surface section 38 of tubular section 20 is roughened, wherein listed surface section 38 may, for example be sand blasted or correspondingly coarsely worked for this purpose. Surface 38 thereby comprises in particular individual sections of the elevations 28, which face outward in radial direction 10 and are arranged spaced apart from one another and following one another in circumferential direction 12, 14.

In addition, a filler 40 for holding back the liquid or viscous material, described later in greater detail, is introduced into depressions 26 in method step 42, as this is indicated for example by way of filler 40 in the lower half of FIG. 1. Stated more precisely, filler 40 is introduced into all those areas of depressions 26 which are arranged between the previously mentioned sections of elevations 28 of surface section 38. In a corresponding way, filler 40 is also introduced into recess 30, or at least into that section of recess 30 which extends up to surface section 38. Filler 40 may be, for example, a mixture of cotton flock and polyester resin, wherein a filler basically is to be selected which cures up to a certain level prior to the next method step or is already present as rigid inserts; however, may be removed again relatively easily from tubular section 20 of disk carrier 18 and the cured support ring 32, described later in greater detail. Depressions 26 and/or recess 30 do not have to be completely filled with respect to the radial extension thereof. It is also preferred if filler 40 is introduced in such a way that a straight line bridging of depressions 26 and/or recess 30 is guaranteed by the corresponding section of support ring 32. By this means, in particular when using a string-like or strip-like fiber material and/or fabric material, to be described later, a certain pretension may be applied during winding, which pretension is also retained after a possible removal of filler 40. In order that the surfaces of filler 40 facing outward in radial direction 10 have the desired position and shape, filler 40 may preferably or as needed be post-processed in a way that removes material.

In a subsequent method step 44, a string-like or strip-like fiber material or fabric material 46 is provided which is mixed or impregnated with a liquid or viscous curable material 48. Fiber material and/or fabric material 46 may comprise carbon fibers and/or carbon fiber fabric and/or fiberglass and/or fiberglass fabric. Alternatively, the fiber material and/or fabric material 46 may also be made from carbon fibers and/or carbon fiber fabric and/or fiberglass and/or fiberglass fabric. Liquid or viscous material 48 may, in contrast, be a material which cures at least partially at room temperature and/or at a temperature above room temperature. A photo-curable material is also possible for claimed material 48. Thus, material 48 may be formed, for example, from a plastic, lacquer, adhesive, or resin, preferably epoxy resin.

In method step 50, fiber material and/or fabric material 46, which was initially mixed or impregnated with liquid or viscous material 48, is applied, together with liquid or viscous material 48, for forming support ring 32 surrounding tubular section 20 in surface section 38. Stated more exactly, string-like and/or strip-like fiber material and/or fabric material 46 provided in the embodiment shown is wound around tubular section 20 in the area of surface section 38, wherein the winding angle is greater than 360° and a winding angle is preferably at least 720° or more than 720°. Filler 40 thereby prevents a penetration of liquid or viscous material 48 into both depressions 26 and also a penetration into recess 30, shown by way of example in FIG. 1, so that liquid or viscous material 48, together with fiber material and/or fabric material 46, is applied while creating a support ring 32 which bridges depressions 26 and recess 30. Basically, filler 40 does not have to completely prevent the penetration of liquid or viscous material 48 into depressions 26 and recess 30; instead, filler 40 may also be dimensioned in such a way that liquid or viscous material 48 may penetrate into a section of depressions 26 and recess 30 facing support ring 32.

In a subsequent method step 52, the curing of support ring 32 is carried out, in which liquid or viscous material 48 cures. The curing of support ring 32 may thereby be carried out partially automatically at room temperature. Alternatively, and also preferably, the curing of support ring 32 is carried out by heating support ring 32 to a temperature above room temperature, thus, for example, in a furnace. It has also proven advantageous to carry out the heating of support ring 32 with a chronological changing of the temperature in order to carry out or to control the curing in a targeted way. In this context, it has also proven advantageous if the curing of support ring 32 is initially carried out automatically at room temperature and subsequently through heating, and here preferably with chronological changing of the temperature.

Liquid or viscous material 48 is a material which shrinks during curing so that the shrinkage of material 48 is carried out during curing under a pretension of support ring 32 against tubular section 20 inward in radial direction 10. Liquid or viscous materiel 48 used is also a material which is materially bonded and or adhered to tubular section 20, stated more exactly, to the individual sections on elevations 28 of surface section 38, due to the curing. During the previously mentioned shrinkage, a particularly exact adaptation of support ring 32 to tubular section 20 and a pretension of the same against tubular section 20 inward in radial direction 10 is effected, by which means disk carrier 18 may also be used at high rotational speeds and support ring 32 is fixed relatively securely on tubular section 20, an axial fixing of support ring 32 in axial directions 4, 6 is effected in particular by the bonded connection and/or the adhesion of material 48 during curing of the same to tubular section 20, such that material connecting means or measures for fixing in axial directions 4, 6 may be omitted.

After the curing of support ring 32, filler 40 is removed from depressions 26 and recess 30 (method step 54).

If a material 48 were to be used which does not shrink during curing, wherein a certain pretension in radial direction 8, 10 is still to be provided between support ring 32 and tubular section 20, then tubular section 20 may be compressed flexibly inward in radial direction 8 prior to the application of liquid or viscous material 48, together with fiber material and or fabric material 46, in a method step 56, before the application (method step 50) and the curing (method step 52) are carried out in order to end the compression after the curing. In this case, tubular section 20 expands back outward in radial direction 10 in order to achieve the previously mentioned pretension in radial direction 8, 10 between tubular section 20 and support ring 32. Naturally, this method step 56 may also be used when using a material 48 which shrinks during curing in order to further increase the pretension.

Even if, in the described embodiment, fiber material and/of fabric material 46 is initially mixed or impregnated with liquid or viscous material 48 before the materials are applied together on tubular section 20 to form support ring 32, other procedures are fundamentally also possible, even if not quite advantageous in individual cases. Thus, for example, the possibility exists in the context of method step 50, of initially applying fiber material and/or fabric material 46, which is then also formed, if necessary, as string-like and/or as strip-like, on tubular section 20, and then subsequently liquid or viscous material 48 is applied on tubular section 20 for mixing with fiber material and/or fabric material 46 and/or impregnating fiber material and/or fabric material 46. Conversely or alternatively, liquid or viscous material 48 may be applied first to the tubular section 20 and subsequently fiber material and/or fabric material 46 may be applied on tubular section 20 for mixing or impregnating fiber material and/or fabric material 46 with liquid or viscous material 48. According to the achievable strength of cured material 48, fiber material and/or fabric material 46 may also be completely omitted.

LIST OF REFERENCES

2 Disk carrier assembly
4 Axial direction
6 Axial direction
8 Radial direction
10 Radial direction
12 Circumferential direction
14 Circumferential direction
16 Axis of rotation
18 Disk carrier
20 Tubular section
22 Support section
24 Disk carrying section
26 Depressions
28 Elevations
30 Recess
32 Support ring
34 Method step
36 Method step
38 Surface section
40 Filler
42 Method step
44 Method step
46 Fiber material and/or fabric material
48 Material
50 Method step
52 Method step
54 Method step
56 Method step

The invention claimed is:

1. A method for producing a disk carrier assembly (2) for a disk clutch or a disk brake, comprising the steps of: providing a disk carrier (18) with a tubular section (20), applying a liquid or viscous material (48) on the tubular section (20) to form a support ring (32) surrounding the tubular section (20), and curing the support ring (32).

2. The method according to claim 1, wherein a material (48) which shrinks during curing is used as the material (48).

3. The method according to claim 2, wherein the shrinkage of the material (48) is carried out under pretension of the support ring (32) against the tubular section (20) inward radial direction (10).

4. The method according to claim 1, wherein a material (48) which materially bonds and/or adheres to the tubular section (20) during curing is used as the material (48).

5. The method according to claim 1, wherein fiber material and/or fabric material (46) is additionally applied on the tubular section (20) for forming the support ring (32) from the liquid or viscous material (48) and the fiber material and/or fabric material (46).

6. The method according to claim 5, wherein the fiber material and/or fabric material (46) is initially mixed with the liquid or viscous material (48) and subsequently, the fiber material and/or fabric material (46) is applied, together with the liquid or viscous material (48), on the tubular section (20) for forming the support ring (32).

7. The method according to claim 5, wherein initially the fiber material and/or fabric material (46) is applied on the tubular section (20) and subsequently the liquid or viscous material (48) is applied on the tubular section (20) for mixing with the fiber material and/or fabric material (46) or for impregnating the fiber material and/or fabric material (46), and/or in which initially the liquid or viscous material (48) is applied on the tubular section (20) and subsequently the fiber material and/or fabric material (46) is applied to the tubular section (20) for mixing or impregnating the fiber material and/or fabric material (46) with the liquid or viscous material (48).

8. The method according to claim 5, wherein the fiber material and/or fabric material (46) is provided as a string or a strip.

9. The method according to claim 8, wherein the string or the strip fiber material and/or fabric material (46) is mixed or impregnated with the liquid or viscous material (48) and is wound around tubular section (20) at a winding angle of more than 360°.

10. The method according to claim 5, wherein the fiber material and/or fabric material (46) contains carbon fibers and/or carbon fiber fabric and/or fiberglass and/or fiberglass fabric and/or is made of carbon fiber and/or carbon fiber fabric and/or fiberglass and/or fiberglass fabric.

11. The method according to claim 1, wherein the liquid or viscous material (48) is a material (48) which cures at least partially at room temperature, and/or at a temperature above room temperature, and/or is a photo-curing material (48), and/or is a plastic, lacquer, adhesive, or resin.

12. The method according to claim 11, wherein the resin is an epoxy resin.

13. The method according to claim 1, wherein the curing of the support ring (32) is carried out at least partially at room temperature and/or at least partially by heating the support ring (32) to a temperature above room temperature.

14. The method according to claim 13, wherein the curing of the support ring (32) is carried out initially at room temperature and subsequently due to heating.

15. The method according to claim 1, wherein a surface section (38) of the tubular section (20), on which the liquid or viscous material (48) is applied, is roughened prior to the application.

16. The method according to claim 1, wherein the liquid or viscous material (48) is applied while creating a support ring (32) which bridges depressions (26) and/or recesses (30) in the tubular section (20).

17. The method according to claim 16, wherein prior to the application, a filler (40) is introduced into the depressions (26) and/or recesses (30) for holding back the liquid or viscous material (48).

18. The method according to claim 17, wherein the filler is removed from the depressions (26) and/or recesses (30) after the application and curing of the support ring (32).

19. The method according to claim 18, wherein the filler is a mixture of cotton flock and polyester resin.

20. The method according to claim 1, wherein the tubular section (20) is elastically compressed in radial direction (8) prior to the application of the liquid or viscous material (48) and the compression is ended after the curing of the liquid or viscous material (48).

\* \* \* \* \*